United States Patent [19]

Austin et al.

[11] 3,999,573
[45] Dec. 28, 1976

[54] TAP OR VALVE

[75] Inventors: George Alfred Braisby Austin, Noble Park; Robert Speedie, Burwood, both of Australia

[73] Assignee: Illinois Tool Works Inc., Chicago, Ill.

[22] Filed: June 3, 1975

[21] Appl. No.: 583,376

[30] Foreign Application Priority Data
June 7, 1974 Australia .............. 7823/74
May 2, 1975 Australia .............. 1449/75

[52] U.S. Cl. .............. 137/614.11; 137/614.18; 137/625.44
[51] Int. Cl.² .............. F16K 11/00
[58] Field of Search .............. 137/614.11, 614.18, 137/625.44

[56] References Cited
UNITED STATES PATENTS

| | | | |
|---|---|---|---|
| 77,517 | 5/1868 | Moore et al. | 137/614.11 |
| 635,104 | 10/1899 | Lunken | 137/614.11 |
| 1,957,090 | 5/1934 | Berkeley | 137/614.11 |
| 2,531,679 | 11/1950 | Glos | 137/614.11 |
| 3,402,738 | 9/1968 | Perolo | 137/614.11 |
| 3,913,618 | 10/1975 | Speedie | 137/610 |

FOREIGN PATENTS OR APPLICATIONS 625,411  2/1934  Germany .............. 137/614.11

Primary Examiner—William R. Cline
Assistant Examiner—H. Jay Spiegel
Attorney, Agent, or Firm—J. R. Halvorsen; R. W. Beart

[57] ABSTRACT

A tap or valve for controlling the flow of liquid including a valve housing with a valve chamber therein the latter having a peripheral wall with an outlet opening in said wall, a valve member mounted for movement in the valve chamber from an outlet closing position to a position clear of that opening, an inlet opening to permit the flow of liquid into the valve chamber, and a side member movable with the valve member and arranged to provide for a metering of the liquid flowing from the inlet opening to the valve chamber and thence out through the outlet opening.

10 Claims, 12 Drawing Figures

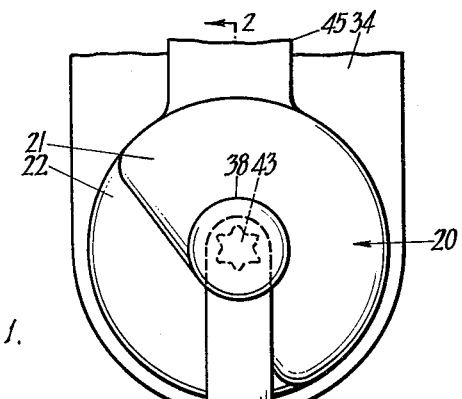
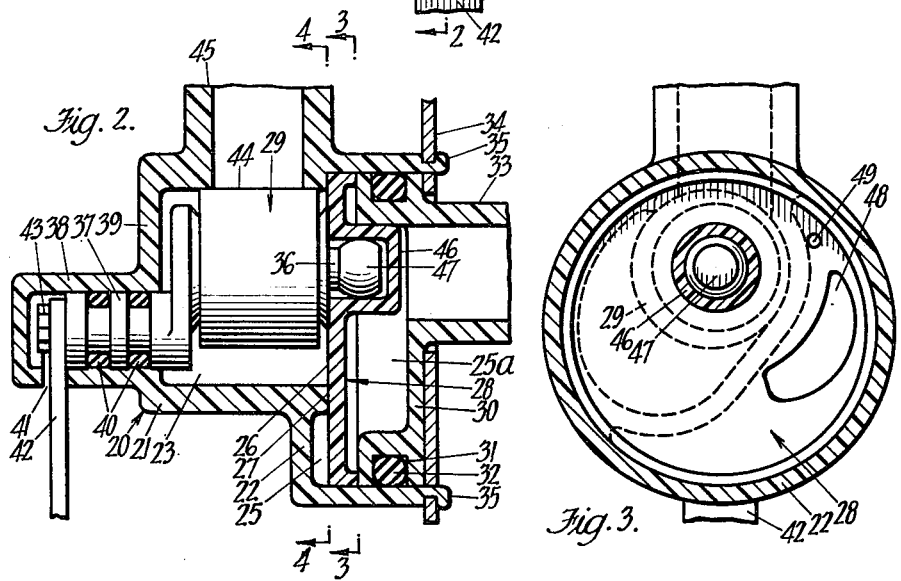
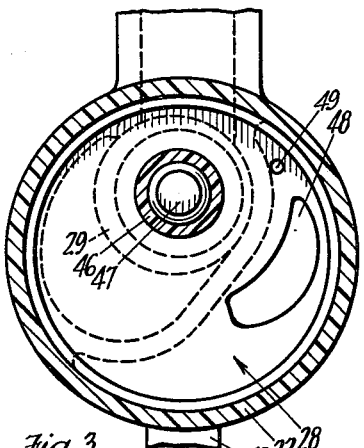
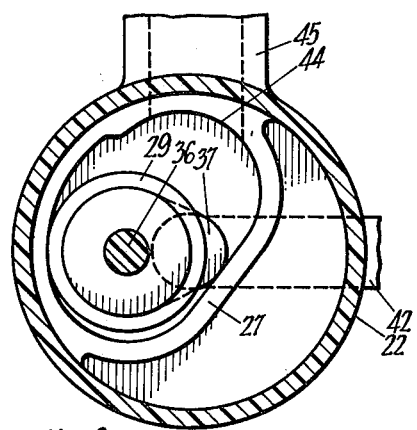
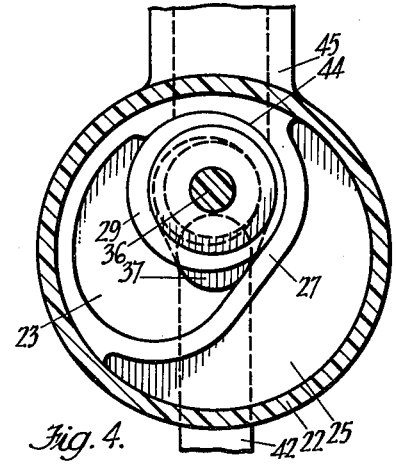

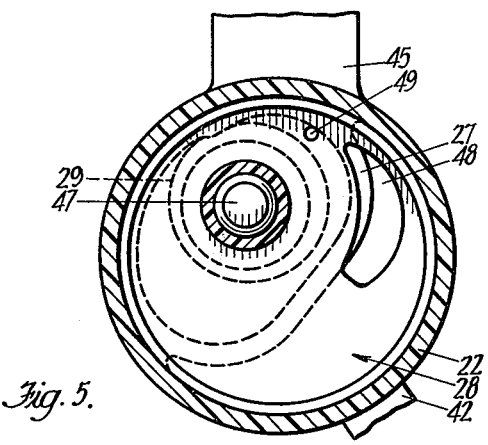
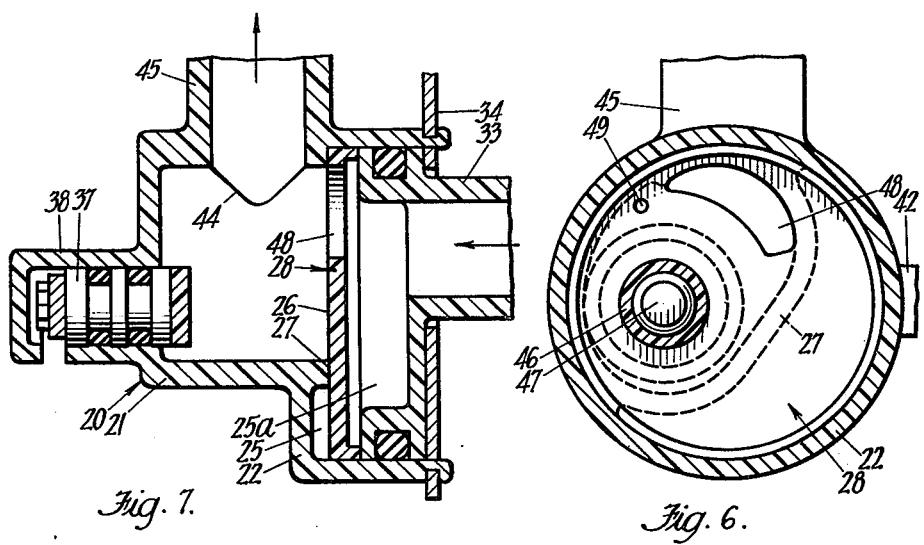
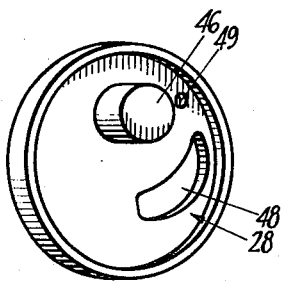

TAP OR VALVE

This invention refers to an improved tap or valve and it refers particularly, but not exclusively, to a tap or valve for a heater system for motor cars.

The invention has been devised particularly with the object of providing a tap or valve of simple construction having means for metering the flow of fluid through the tap. Another object is to provide an improvement in that type of tap or valve including a valve housing having a valve chamber therein with said chamber having a peripheral wall with an outlet opening therein, a resilient roller supported in a crank pin and arranged to move on said peripheral wall to open or close the said outlet opening wherein there is provided means for metering the flow of fluid through the valve.

A further object is to provide a tap of simple design and construction wherein accuracy of manufacture is not an important consideration and having means for regulating the flow of fluid wherein the rate of fluid flow is approximately a straight line relationship with the movement of the control means for actuating the tap.

According to this invention there is provided a tap or valve for controlling the flow of liquid comprising, a valve housing having a valve chamber therein, said valve chamber having a peripheral wall with an outlet opening in said wall, a valve member for movement in the valve chamber from a position closing the outlet opening to a position clear of that opening, an inlet opening to permit the flow of liquid into the valve chamber, and a side member movable with the valve member and constructed to provide for a metering of the liquid flowing from the inlet opening to the valve chamber and thence out through the outlet opening.

The side member may be a support for one end of a crank pin which supports, and moves, the valve member, the other end of the crank pin being supported by a crank arm operatively connected to an actuating member.

Said side member may be mounted so as to project over the inlet to the valve chamber when the tap is in the closed or off position, or it may be mounted so as to constitute a closure for one end of the valve chamber, there being a liquid inlet chamber spaced from the valve chamber and separated therefrom by the side member.

The side member may be formed integrally with the crank pin and it may have a slot, as a vee-shaped slot, for registering with the inlet opening and providing for a more gradual inflow of fluid than occurs when a straight edge is drawn over a round opening. The slot may be shaped to provide for an even rate of increase of the fluid flow as the valve or tap is opened — a straight line relationship between the movement of the valve and the volume of fluid flowing through the inlet, or it may be shaped to provide a very small flow at the outset and a gradual increase in flow rate, less than a straight line relationship, or a varied rate of flow which is greater than the straight line relationship.

In an alternative construction that surface of the side member adjacent the wall of the valve chamber may be chamfered, tapered or otherwise shaped to provide a similar effect — a rate of flow which varies with the degree of opening of the inlet but differing from the rate when a straight edge is drawn over the opening.

There may be a combination of the slot and the chamfer — as by providing a Vee-shaped chamfer, the depth of the chamfer or recessed part being greatest at the location where the slot is widest.

As the side member has the metering means provided in it there is no extra operations in the formation of the metering means, and no additional assembly cost.

In one arrangement, the crank pin may be free at one end and there may be a side member of circular shape to fit neatly within a circular valve housing and having a hollow embossment at a suitable location for receiving that free end of the crank pin, so that upon movement of the crank pin the side member will be caused to rotate in the valve housing. The valve chamber forms a part only of the interior of the valve housing and the side member bears upon and closes an open end of the valve chamber. The side member is spaced from the end of the valve housing having the inlet opening so that the liquid can accumulate within that space. The pressure of the liquid will tend to hold the side member against the end of the valve chamber so as to close that end.

In this construction the side member has a peripheral flange which fits neatly in a circular part of the valve housing, a small hole near that flange to permit a very small flow of liquid into the valve chamber when the side member is turned to an appropriate location. At a different position there is a slot or opening near the flange, and said opening is tapered towards one end and substantially uniform width for a distance adjacent the opposite end, so as to provide for a small flow initially into the valve chamber as the side member is being turned and then for an increased flow at a uniformly increasing rate as the part of the slot of even width comes into register with the valve chamber.

It is preferred that the free end of the crank pin be made of rounded shape, or in the form of a spherical segment, to provide for easy movement in a hollow embossment of the side member.

In order that the invention may be clearly understood and readily put into practical form reference will now be made to the accompanying sheets of illustrative drawings which depict two exemplary constructions of valve made according to this invention. In these drawings:

FIG. 1 is an end view of a preferred construction of valve;

FIG. 2 shows a longitudinal cross-section on the line and in the direction of the arrows 2—2 of FIG. 1, with the valve member in closed position;

FIG. 3 illustrates a transverse cross-section through the valve, showing the valve member in a closed position, the section being taken on the plane and in the direction indicated by the line and arrows 3—3 of FIG. 2;

FIG. 4 illustrates a transverse cross-section through the valve and showing the valve member in closed position, the section being taken on the plane and in the direction indicated by the line and arrows 4—4 of FIG. 2;

FIG. 5 is a view similar to FIG. 3 but showing the valve member in partly open position;

FIG. 6 is a view similar to FIGS. 3 and 5 but showing the valve member in fully open position;

FIG. 7 is a longitudinal cross-section similar to FIG. 2 but showing the valve in the open position;

FIG. 8 shows a transverse cross-section similar to FIG. 4 but with the valve member in open position;

FIG. 9 is a perspective view of the side member which meters the flow of liquid from the inlet opening to the valve chamber;

Figure 10:
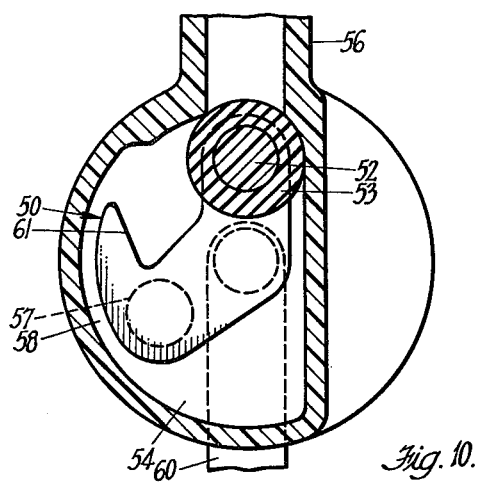
FIG. 10 illustrates a transverse cross-section through an alternative construction of valve and showing the valve member in the closed position.

In the preferred embodiment of the tap or valve illustrated in FIGS. 1 to 9 there is provided a casing indicated generally at 20, said casing being formed in two sections 21 and 22. The section 21 includes a segmental valve chamber 23 and the other section 22 forms a circular chamber 25 in communication with the valve chamber 23. The perimeter of the opening 26, communicating the valve chamber 23 with the chamber 25, is formed as a continuous bearing surface 27 against which a side member 28, positioned in the chamber 25 is adapted to bear.

The side member 28 is in the form of a flanged disc and is moved by and in conjunction with a roller valve member 29 operating in the valve chamber 23 in a manner to be hereinafter described.

The side member 28 is retained in operative position by a closure member 30 having a circular groove 31 therein to receive an O-ring 32 to thereby provide a sealing closure for the chamber 25. The closure member 30 includes the inlet pipe 33 which is in communication with the chamber 25, through a liquid inlet chamber 25a formed between the side member 28 and closure member 30. The said member 30 is retained in position, in known manner, by an apertured support or mounting plate 34 for the casing 20. The plate 34 having spaced apertures therein, to receive correspondingly spaced hook members 35 formed on the section 22 of the casing 20 and to thereby secure the casing 20 to said plate.

The roller valve member 29 comprises a resilient roller 29 rotatable on the pin 36 of a cranked shaft 37 supported in a bearing boss 38 formed in the end wall 39 of the section 21 of the casing 20.

The shaft 37 is grooved to receive O-rings 40 to effect a seal engagement of the shaft in the boss 38. The end of the boss 38 is closed and a slot 41 in the side wall thereof provides entry for an actuating lever 42 which engages the fluted end 43 of the shaft 37 to provide an operative connection between the shaft and the lever.

The valve chamber 23 has an outlet opening 44 in the peripheral wall thereof, the valve roller 29 being arranged to move in an arcuate movement to cover or uncover the opening 44 which communicates with an outlet pipe 45.

The side member 28 is provided with a hollow boss 46 which receives the spherical end 47 of the crank pin 36 so that the crank pin in its arcuate movement effects rotational movement of the side member 28 about its axis. When the roller valve 29 is moved to uncover the outlet opening 44 the side member 28 is moved correspondingly and as it is provided with a shaped aperture 48 which moves over portion of the bearing surface 27 to make a communication between the inlet 33 and the valve chamber 23 and thereby allow passage of fluid from the inlet pipe 33 to the outlet pipe 45. The aperture 48 in the side member 28 may be shaped in suitable manner to provide a metered rate of fluid flow from the inlet 33 to the valve chamber. FIGS. 3, 5, 6 and 9 show a small aperture 49 which may be provided in advance of the aperture 48 whereby a bleed connection between the inlet and the valve chamber 23 may first be established.

Figure 11:
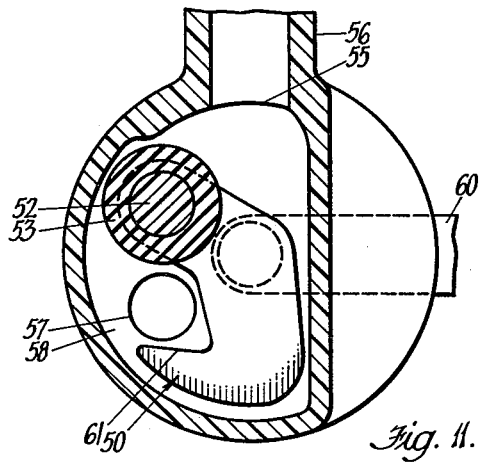
FIG. 11 is a view similar to FIG. 10 but showing the valve member in fully open position.
Figure 12:
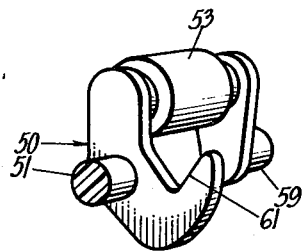
FIG. 12 is a detail perspective view of the valve member and metering means, movable with the valve member, included in FIGS. 10 and 11.

In the alternative construction illustrated in FIGS. 10 to 12 the side member 50 is formed integrally with the shaft 51, the crank pin 52 of which has rotatably mounted thereon the roller valve member 53. The crank, valve member 53 and side member 50 being located within the valve chamber 54 which has in the peripheral wall thereof an outlet opening 55 communicating with outlet pipe 56. An inlet opening 57 is provided in the end wall 58 of the chamber 54. The inner end 59 of the crank shaft 51 is supported in a bearing in a cover plate (not shown) for the chamber 54 while the outer end of the shaft 52 is connected, in suitable manner to an actuating lever 60. One fact of the side member 50 moves over the inner surface of the wall 58 of the chamber 54 to cover the inlet opening 57 when the roller valve member 53 is in the closed position shown in FIG. 10. The side member 50 is formed with a V-shaped slot 61 arranged to provide a metered flow of fluid into the chamber as the valve member 53 is moved from the closed position to the open position shown in FIG. 11. The shape of the slot 61 may be varied in any suitable manner to provide a required varied rate of fluid flow through the inlet opening 57 as it is progressively uncovered by the side member 50.

In both the above described embodiments the actuating lever may be made of metal and the crank pin and side member of a suitable plastic material. The valve housing may also be of plastic material. The actuating lever may have a square or other non-circular hole near its inner end to engage a similarly shaped end of the crank pin, and it may be held in position by a screw or other suitable means.

Obviously, this metering means may be incorporated in other constructions of valve or tap, the main feature being the provision of a side plate, side arm or other member to sweep across an opening of the tap and having means such as a slot or chamfer or taper to gradually permit during the opening operation, a greater inflow of fluid through an opening with which it is adapted to register. During the closing operation the rate of inflow of fluid is gradually reduced. If that opening is the inlet opening any suitable means may be provided to positively close the outlet opening, such as the loosely mounted flexible roller described in the specification of Australian Pat. No. 453,993.

It is to be understood that minor modifications may be made in details of design and construction without departing from the ambit of the invention as herein disclosed.

We claim:

1. A tap or valve for controlling the flow of liquid comprising a valve housing having a valve chamber therein, a peripheral wall in the valve chamber, an outlet opening in said wall, a valve member mounted for movement in the valve chamber from a position closing the outlet opening to a position clear of that opening, an inlet opening in one end of the valve chamber to permit the flow of liquid into the valve chamber, and a side member forming a closure for said one end of the valve chamber and movable simultaneously with the valve member and constructed to provide for a metering of the liquid flowing from the inlet opening to the valve chamber and thence out through the outlet opening.

2. A tap or valve as claimed in claim 1 and wherein the side member supports one end of a crank pin which supports and moves the valve member, and with the other end of the crank pin being supported by a crank arm operatively connected to an actuating member.

3. A tap or valve as claimed in claim 1 wherein the side member is mounted so as to project over and close the inlet to the valve chamber when the valve member is in the outlet closing position.

4. A tap or valve as claimed in claim 2 wherein the side member is formed integrally with the crank pin, and a shaped slot in the side member for registering with the inlet opening to provide a gradual predetermined flow rate of liquid from the inlet opening.

5. A tap or valve as claimed in claim 1 wherein said valve is provided with a liquid inlet chamber spaced from the valve chamber and separated therefrom by the side member.

6. A tap or valve for controlling the flow of liquid including a valve housing, a valve chamber therein having at least one open end wall, said chamber forming a part of the interior of the valve housing and having a peripheral wall in the valve chamber, an outlet opening in said peripheral wall, a valve member in said valve chamber and mounted on a crank pin supported by a crank arm operatively connected to an actuating member to move the valve member from an outlet closing position to an outlet opening position, a side member connected to and movable by the crank pin and with said side member bearing upon and forming a closure for said open end wall of the valve chamber, said closure being spaced from an end of the valve housing which has an inlet opening therein so that liquid passing through said opening can accumulate within that space formed between the said end of the valve housing and said side member, and at least one aperture in the side member arranged as the valve member is moved from the outlet closing position to admit liquid from said space into the valve chamber in a metered manner and thence out through the outlet opening.

7. A tap or valve as claimed in claim 6 wherein the side member is of circular shape fitting within the valve housing, said side member having a recess for receiving a free end of the crank pin, so that upon movement of the crank pin the side member will be caused to rotate in the valve housing.

8. A tap or valve as claimed in claim 6 wherein liquid accumulating in said space tends to hold the side member against the end of the valve chamber in sealing engagement therewith.

9. A tap or valve as claimed in claim 7 wherein the free end of the crank pin is of rounded shape to provide easy movement of the crank pin in the recess in the side member.

10. A tap or valve as claimed in claim 6 wherein a continuous bearing surface is provided around the open end of the valve chamber and against which the side member bears.

* * * * *